United States Patent [19]
Rodrigues

[11] Patent Number: 6,075,093
[45] Date of Patent: Jun. 13, 2000

[54] LAUNDRY DETERGENTS CONTAINING STYRENE-ANHYDRIDE COPOLYMERS GRAFTED WITH POLYETHYLENE GLYCOL

[75] Inventor: Klein A. Rodrigues, Signal Mountain, Tenn.

[73] Assignee: National Starch and Chemical Investment Holding Corporation, Wilmington, Del.

[21] Appl. No.: 09/094,104

[22] Filed: Jun. 9, 1998

Related U.S. Application Data

[63] Continuation-in-part of application No. 09/047,032, Mar. 24, 1998, abandoned.

[51] Int. Cl.$^7$ ............................ C08L 35/06; D06M 15/00
[52] U.S. Cl. ........................... 525/207; 525/285; 525/384; 525/404; 525/65; 525/54.23; 524/504; 524/557; 252/8.62; 252/8.63; 510/529
[58] Field of Search ..................................... 525/207, 285, 525/384, 404, 65, 54.23; 524/504, 557; 252/8.62, 8.63; 510/529

[56] References Cited

U.S. PATENT DOCUMENTS 4,176,079 11/1979 Guerry et al. ............................. 252/89

*Primary Examiner*—James J. Seidleck
*Assistant Examiner*—Olga Asinovsky
*Attorney, Agent, or Firm*—John D. Thallemer

[57] ABSTRACT

A laundry detergent composition comprising a surfactant, builder and from about 0.1 to about 25 weight percent, based on the total weight of the laundry detergent composition, of a styrene-anhydride copolymer grafted with polyethylene glycol which is prepared by reacting in a solvent styrene monomer selected from styrene and substituted styrene, with an anhydride monomer selected from maleic anhydride and itaconic anhydride, to form a styrene-anhydride copolymer which is reacted with polyethylene glycol, to form a styrene-anhydride copolymer grafted with polyethylene glycol. The styrene-anhydride copolymers grafted with polyethylene glycol when used in a laundering process, remove soil from fabrics, inhibit soil deposition on fabrics, and provide soil resistance to fabrics.

24 Claims, No Drawings

LAUNDRY DETERGENTS CONTAINING STYRENE-ANHYDRIDE COPOLYMERS GRAFTED WITH POLYETHYLENE GLYCOL

CROSS-REFERENCE TO RELATED APPLICATIONS

This application is a continuation-in-part of U.S. patent application Ser. No. 09/047,032, filed Mar. 24, 1998 now is abandoned.

FIELD OF THE INVENTION

This invention relates to a laundry detergent composition containing styrene-anhydride copolymer grafted with polyethylene glycol. The graft copolymers are effective as soil release agents on cotton, cotton blends and polyester.

BACKGROUND OF THE INVENTION

Various soil release agents which are effective on polyester are well known in the art. These are typically short chain polyesters and comprise a mixture of terephthalate residues and ethyleneoxy or propyleneoxy polymeric units. Such soil release agents are structurally similar to the polyester fabric, and thus, tend to build a protective film on the polyester fabric which enables easier cleaning. These soil release agents are much less effective on blends of polyester and cotton, and are completely ineffective on cotton. Generally, the majority of fabrics which require laundering are cotton or cotton blends. Hence there is a continuing need for soil release agents on cotton and cotton blends. An additional advantageous soil release agent would provide soil release benefits on polyester.

Styrene-maleic anhydride graft copolymers have been used in detergent compositions and cementitious mixtures. U.S. Pat. No. 3,485,762 describes a detergent composition containing an ammonium salt of a styrene-maleic anhydride resin and a non-ionic, hydroxyl containing surfactant. The nonionic surfactants and the styrene-maleic anhydride resins are present in the detergent composition as a physical mixture or as a partial ester of the nonionic hydroxyl-containing surfactant with styrene-maleic anhydride resin. Detergent compositions prepared with the styrene-maleic anhydride resin and nonionic surfactant are effective for cleaning hydrophobic substrates such as polyesters due to the hydrophobic nature of the nonionic, hydroxyl containing surfactant.

U.S. Pat. No. 5,158,996 describes a copolymer for use in a cementitious mixture. The copolymer is prepared by reacting styrene-maleic anhydride with a polyalkylene glycol. The copolymers act as a plasticizer and fluidifies cementitious mixtures. However, the use of such polymers in detergents has not been disclosed.

SUMMARY OF THE INVENTION

Accordingly, it is an object of the invention to provide a soil release agent which is effective on cotton, blends of cotton, and polyester.

It is also an object of the invention to provide a soil release agent which is compatible in liquid laundry detergent compositions.

With regard to the foregoing and other objects, the present invention provides a laundry detergent composition comprising a surfactant, builder and from about 0.1 to about 25 weight percent, based on the total weight of the laundry detergent composition, of a styrene-anhydride copolymer grafted with polyethylene glycol which is prepared by reacting in a solvent styrene monomer selected from the group consisting of styrene, substituted styrene, and mixtures thereof, with an anhydride monomer selected from the group consisting of maleic anhydride, itaconic anhydride, and mixtures thereof, to form a styrene-anhydride copolymer which is reacted with polyethylene glycol having the formula $R^1$—$(CH_2CH_2O)_m$—$R^2$— wherein $R^1$ is OH or $NH_2$; $R^2$ is selected from the group consisting of an alkyl group having $C_1$–$C_4$, phenol, and H; and m is from about 2 to about 100, to form a water-soluble or water dispersible styrene-anhydride copolymer grafted with polyethylene glycol. More preferably, the styrene-anhydride copolymer grafted with polyethylene glycol comprises half esters of styrene-maleic anhydride copolymers and polyethylene glycol and is prepared in the presence of a hydrophobe.

According to another aspect the invention provides a styrene-anhydride copolymer which is alkoxylated to form a water-soluble or water dispersible styrene-anhydride copolymer grafted with polyethylene glycol, wherein the alkoxylation is accomplished using ethylene oxide or a combination of ethylene oxide and an alkyl oxide having 3 to 20 carbon atoms.

According to an additional aspect the invention provides a method of cleaning fabrics which involves preparing a laundry detergent composition comprising the water-soluble or water dispersible styrene-anhydride copolymer grafted with polyethylene glycol, contacting the laundry detergent composition with one or more fabrics, wherein at least one of the fabrics contains soil, and removing at least a portion of the soil from the fabric containing soil.

The water-soluble or water dispersible styrene-anhydride copolymers grafted with polyethylene glycol when used in a laundering process, remove soil from fabrics, inhibit soil deposition on fabrics, and provide soil resistance to fabrics. The styrene-anhydride copolymer grafted with polyethylene glycol are sufficiently hydrophilic to absorb to the fabrics. While not wishing to be bound by any particular theory, the present inventor believes that the styrene-anhydride copolymer grafted with polyethylene glycol modifies the surface of cotton fibers during the washing process so that when the fabric is subsequently stained, the stain can be more easily removed in the next wash.

DESCRIPTION OF THE INVENTION

Typical laundry detergent compositions which may be improved by the addition of the water-soluble or water dispersible styrene-anhydride copolymer grafted with polyethylene glycol of this invention are disclosed in U.S. Pat. Nos. 5,147,576; 5,132,053; 5,110,506; 4,923,635; 4,873,012; 4,663,071; and 4,906,397; which are hereby incorporated by reference.

The water-soluble or water dispersible styrene-anhydride copolymer grafted with polyethylene glycol of the invention is prepared by first reacting a styrene monomer selected from styrene and substituted styrene with an anhydride monomer selected from maleic anhydride and itaconic anhydride in a solvent to form a styrene-anhydride copolymer. Mixtures of styrene monomers and anhydride monomers may also be used. The styrene-anhydride copolymer is formed by free radical polymerization techniques which are well known to those skilled in the art.

As used herein, "substituted styrene" means any monomer containing a vinyl benzene group. Examples of substituted styrene monomers are, but are not limited to, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

The styrene-anhydride copolymer is then reacted with polyethylene glycol to form a water-soluble or water dispersible styrene-anhydride copolymer grafted with polyethylene glycol. The polyethylene glycol has the formula $R^1$—$(CH_2CH_2O)_m$—$R^2$— wherein $R^1$ is OH or $NH_2$; $R^2$ is selected from an alkyl group having $C_1$–$C_4$, phenol, and H; m is from about 2 to about 100. Preferably, $R^2$ is methyl and m is from about 8 to about 50, most preferably 12 20 to 20. It is within the scope of the invention that some of the polyethylene glycol remain unreacted. It is also within the scope of the invention that some of the anhydride moieties on the styrene-anhydride copolymer remain unreacted. In addition, the unreacted anhydride moieties may hydrolyze in the presence of water to form the corresponding dicarboxylic acid.

The amine or hydroxyl functional group on the polyethylene glycol is capable of reacting with the anhydride moiety which is present in the backbone of the styrene-anhydride copolymer. The polyethylene glycol may have more than one functional group provided that the degree of crosslinking is such that an insoluble gel is not formed. The present inventor has determined that too much crosslinking between the styrene-anhydride copolymers grafted with polyethylene glycol produces an insoluble gel.

The polyethylene glycol or derivative of polyethylene glycol has a weight average molecular weight of 100 to 20,000, preferably 200 to 6000, more preferably 500 to 800. Most preferably, the polyethylene glycol is methoxy polyethylene glycol having a weight average molecular weight of about 550 to about 750. In general, a greater degree of crosslinking can be tolerated when using higher molecular weight polyethylene glycol or derivatives of polyethylene glycol than when using lower molecular weight polyethylene glycol or derivatives of polyethylene glycol.

It is within the scope of the invention to alkoxylate at least one of the anhydride moieties on the styrene-anhydride copolymer to form the corresponding graft copolymer. The alkoxylation can be accomplished using ethylene oxide or a combination of ethylene oxide and an alkyl oxide having 3 to 20 carbon atoms, preferably 3 to 6 carbon atoms. Suitable alkyl oxides, other than ethylene oxide, are, for example, propylene oxide, butylene oxide, hexylene oxide, etc. The alkoxylation allows for placement of a terminal hydroxyl group on the side chains of the styrene-anhydride graft copolymer.

It is within the scope of the invention to react the styrene-anhydride copolymer with polyethylene glycol in the presence of a hydrophobe and/or a solvent. However, the present inventor has determined that polyethylene glycol can function as the reaction medium. Common organic solvents are toluene, methylisobutyl ketone, etc. A hydrophobe may also be used after alkoxylation of the anhydride moieties onto the styrene-anhydride copolymer. The hydrophobe has a functional group that reacts with the anhydride moiety on the styrene-anhydride copolymer to form the corresponding esters or amides.

Preferably, the hydrophobe is selected from a polysaccharide based surfactant or a functionalized alcohol alkoxylate having the formula $R^3$—$(CH_2CHR^4O)_m$—$R^5$ wherein $R^3$ is OH or $NH_2$; $R^4$ is selected from hydrogen, methyl, ethyl, propyl, or phenyl; $R^5$ is selected from hydrogen, and a $C_1$–$C_{20}$ alkyl, alkaryl, or aryl group; and m is from 0 to about 20. More preferably, the polysaccharide based surfactant is a alkylpolyglycoside, wherein the alkyl group has $C_6$–$C_{20}$ and the glycoside has one to ten repeat units, or a polyalkylglucamide, wherein the alkyl group has $C_6$–$C_{20}$ and the glucamide group has one repeat unit. It is important to note that when a polysaccharide based surfactant is used as the hydrophobe the degree of esterification is limited to prevent excessive crosslinking which may lead to the formation of an insoluble gel.

More preferably, the hydrophobe is selected from a $C_6$–$C_{20}$ aliphatic alcohol or amine, an alcohol ethoxylate having a $C_6$–$C_{20}$ alcohol and 6 to 20 moles of ethoxylation, and an alkylphenol ethoxylate having a $C_6$–$C_{20}$ alkyl group and 6 to 10 moles of ethoxylation. Combinations of hydrophobes can also be used. Most preferably, the hydrophobe is selected from a $C_8$–$C_{12}$ aliphatic alcohol or amine, an alcohol ethoxylate having a $C_{12}$–$C_{15}$ alcohol and 7 to 9 moles of ethoxylation, and an alkylphenol ethoxylate having a $C_8$–$C_9$ alkyl group and 6 to 8 moles of ethoxylation.

In a preferred embodiment of the invention, the styrene-anhydride copolymer is slurried in polyethylene glycol and a hydrophobe. The slurry is heated to a temperature of from about 50° C. to about 300° C., preferably from about 150° C. to about 200° C. The reaction temperature depends on the molecular weight of the polyethylene glycol and functional groups on the polyethylene glycol. Lower molecular weight polyethylene glycols as well as amino functionalized polyethylene glycols react faster than higher molecular weight polyethylene glycols or hydroxyl functionalized polyethylene glycol. The reaction conditions and process parameters for the esterification or amidation reactions are disclosed in technical liturature available from Elf Atochem entitled, "Reactions of SMA Resins".

A catalyst can be added to speed up the rate of esterification or amidation reaction or to carry out the grafting to higher conversions. Suitable catalysts are known to those skilled in the art and include, but are not limited to methanesulfonic acid and paratoluene sulfonic acid. The reaction product can be diluted with water and neutralized with a base such as NaOH, ammonium hydroxide, diethanol amine, triethanol amine.

In addition to the styrene-maleic anhydride copolymers grafted with polyethylene glycol, the reaction product may contain an unreacted component selected from styrene-maleic anhydride, polyethylene glycol, and styrene-maleic acid. In addition, the reaction product may contain an unreacted hydrophobe such as an alcohol ethoxylate. Preferably, the reaction product comprises a partial ester of the polyethylene glyol and styrene-anhydride copolymer.

The styrene-anhydride copolymer grafted with polyethylene glycol may be used in any cleaning composition which is used to remove soil from an article, preferably a fabric. Preferably the cleaning composition is a laundry detergent composition. In addition, the styrene-anhydride copolymer grafted with polyethylene glycol can be used as a fabric softener. As used herein, "clean" means to remove soil from an article, inhibit soil deposition in a cleaning or washing process, or provide soil resistance to an article or combinations thereof. Articles which may be cleaned using the copolymers of the present invention are articles which come into contact with soil and which are capable of being cleaned in a cleaning process. Examples of articles which may be cleaned using the styrene-anhydride copolymers grafted with polyethylene glycol include fabrics, such as clothing, linens, carpets, or upholstery; hard surfaces such as countertops, windows, floors, dishes, glasses or tiles; or automobiles. Preferably, the fabrics are cotton or blends of cotton.

The laundry detergent composition may be a solid or liquid composition. If the laundry detergent composition is solid, the laundry detergent composition may be in any of the usual physical forms, such as for example, powders, beads, flakes, bars, tablets, noodles, pastes, and slurries. If the laundry detergent composition is liquid, the laundry detergent composition preferably disperses or solubilizes the styrene-anhydride copolymer grafted with polyethylene glycol so that it is easily contacted with the article. The laundry detergent composition may be aqueous or nonaqueous. For example, the styrene-anhydride copolymer grafted with polyethylene glycol may be dissolved or dispersed in water, in one or more solvents or inert diluents. Preferably the laundry detergent composition is aqueous. The laundry detergent composition preferably contains the styrene-anhydride copolymer grafted with polyethylene glycol in an amount of from about 0.1 to about 25 weight percent, more preferably from about 0.5 to about 10 weight percent, and most preferably from about 1 to about 5 weight percent, based on the total weight of the laundry detergent composition. In a laundry detergent, the styrene-anhydride copolymers grafted with polyethylene glycol function to reduce the amount of oily soil that can adhere to a fabric. Subsequent washing of the fabric will remove more soil as a result of the reduced interactions between the soil and the fabric.

The laundry detergent compositions prepared using the styrene-anhydride copolymers grafted with polyethylene glycol contain at least one surfactant and builder. Suitable surfactants include nonionic, anionic, cationic, and amphoteric surfactants. The surfactants which may be used in the laundry detergent compositions according to the invention may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid laundry detergent compositions containing the styrene-anhydride copolymers grafted with polyethylene glycol. Nonionic and anionic surfactant mixtures such as alcohol ethoxylates and LAS are preferred in liquid laundry detergent compositions containing the styrene-anhydride copolymers grafted with polyethylene glycol. The surfactants are present in an amount of from about 1 to about 50 weight percent, preferably from about 2 to about 45 weight percent, and more preferably from about 5 to about 40 weight percent based on the total weight of the laundry detergent composition.

Examples of builders which may be present in the laundry detergent composition include, for example, phosphates, such as pyrophophates, polyphosphates, or sodium tripolyphosphate. Further examples are zeolites, sodium carbonate, poly(carboxylic acids), nitrotriacetic acid, citric acid, tartaric acid, the salts of the aforesaid acids and the monomeric, oligomeric, or polymeric phosphonates. Combinations of builders may also be used. The builders are present in an amount of from 1 to about 85 weight percent, preferably from about 5 to about 50 weight percent based on the total weight of the laundry detergent composition.

The laundry detergent compositions prepared using the styrene-anhydride copolymers grafted with polyethylene glycol may contain any optional components in addition to surfactants and builders which are used in laundry detergent compositions. Such additional components are well known to those skilled in the art and include one or more ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agent, opacifiers, inert diluents, buffering agents, corrosion inhibitors, graying inhibitors, anti-redeposition agents, stabilizers, opacifiers, fillers, builders, phosphate co-builder, and phosphate-replacer builder. Combinations of such additional components may also be used.

In a preferred embodiment of the invention, the styrene-anhydride copolymers grafted with polyethylene glycol are incorporated into a prespotter formulation for direct application to a soiled fabric or carpet. The graft copolymers aid in removal of soil from fabric even if the fabric is subsequently washed in a laundry detergent which does not contain the graft copolymers. When used in a prespotter formulation, the styrene-anhydride copolymers grafted with polyethylene glycol are preferably present in an amount of from about 0.5 to about 75 weight percent, more preferably from about 1 to about 15 weight percent, and most preferably from about 2 to about 10 weight percent, based on the total weight of the prespotter formulation.

The following nonlimiting examples illustrate further aspects of the invention.

EXAMPLE 1

Preparation of styrene-maleic anhydride copolymer grafted with polyethylene glycol.

Styrene-maleic anhydride resin (SMA 1000 from Elf Atochem), 20 grams, was slurried in 39.6 grams of ethoxy polyethylene glycol (CARBOWAX 550 from Union Carbide), 13.5 grams of NEODOL 25-9 and 26.1 grams of NEODOL 25-7 from Shell Chemical. The reaction mixture was heated to 110° C. for 2 hours and the temperature was raised to 140° C. for 3 hours. The reaction product was a clear yellow oil solution which was cooled. Water, 226.1 grams was added. The pH of the solution was then adjusted to between 6 and 7 using about 2 mls of 50% NaOH solution. The final solids of the reaction product was approximately 30 percent.

EXAMPLE 2
Preparation of styrene-maleic anhydride copolymer grafted with polyethylene glycol.

Styrene-maleic anhydride resin (SMA 1000 from Elf Atochem), 20 grams, was slurried in 29.7 grams of ethoxy polyethylene glycol (CARBOWAX 550 from Union Carbide), 10.1 grams of NEODOL 25-9 and 19.8 grams of NEODOL 25-7 from Shell Chemical. The reaction mixture was heated to 160° C. and held at that temperature for a period of 6 hours. The reaction product was a clear yellow oil solution which was cooled and diluted with 185.7 grams of water. The pH of the solution was adjusted to between 6 and 7 using about 2 mls of 50% NaOH solution. The final solids of the reaction product was determined to be approximately 30 percent.

EXAMPLE 3
Preparation of styrene-maleic anhydride copolymer grafted with polyethylene glycol.

Styrene-maleic anhydride resin (SMA 1000 from Elf Atochem), 20 grams was slurried in 19.7 grams of ethoxy polyethylene glycol (CARBOWAX 550 from Union Carbide), 13.5 grams of NEODOL 25-9 and 26.4 grams of NEODOL 25-7 from Shell Chemical. The reaction mixture was heated to 160° C. and held at that temperature for a period of 6 hours. The reaction product was a clear yellow oil solution which was cooled and diluted with 185.7 grams of water. The pH of the solution was then adjusted to between 6 and 7 using about 2 mls of 50% NaOH solution. The final solids of the reaction product was determined to be approximately 30 percent.

EXAMPLE 4
Evaluation of soil release properties of graft copolymers prepared in Examples 1–3.

The styrene-maleic anhydride graft copolymers prepared in Examples 1–3 were evaluated in a soil release test and compared to a commercial soil release polymer (SRP4 from Rhone-Poulenc) which is commonly used to remove soil from polyesters. In this test, 3 swatches were prewashed in a TERG-O-TOMETER at a temperature of 93° F., 110 ppm water hardness and 80 rpm agitation using 0.5 g/L of AATCC detergent and 9 ppm of one of the polymers prepared in Examples 1–4 or SRP4. Each of the swatches was dried and stained with spaghetti sauce. The swatches were washed in a TERG-O-TOMETER at a temperature of 93° F., 110 ppm water hardness and 80 rpm agitation using 0.5 g/L of AATCC detergent and 9 ppm of one of the polymers prepared in Examples 1–4 and SRP4. The soil release properties for each of the swatches is summarized in Table I.

TABLE I

| Polymer | % Soil Release on Polyester | % Soil Release on Cotton |
| --- | --- | --- |
| None | 53.8 | 51.8 |
| SRP4 | 72.0 | — |
| EX. 1 | 74.0 | 65.1 |
| EX. 2 | 74.3 | 65.5 |
| EX. 3 | 68.6 | 64.9 |

The test results in Table 1 clearly show that the styrene-maleic anhdyride copolymers grafted with polyethylene glycol prepared in Examples 1–3 exhibit excellent soil release on cotton and polyester as compared to untreated cotton and polyester. In addition, the styrene-maleic anhdyride copolymers grafted with polyethylene glycol prepared in Examples 1–3 exhibit excellent soil release on cotton and polyester while the commercially available SRP4 polymer only exhibits soil release on polyester.

EXAMPLE 6
Evaluation of styrene-anhydride copolymer grafted with polyethylene glycol in Prespotter Test.

In a prespotter test, 2 grams of each of the polymers prepared in Examples 2–4 were spotted on a stained swatch and allowed to sit overnight. The stained swatch was dust/sebum on cotton (available from Test Fabrics). The swatch was washed in a TERG-O-TOMETER using 0.9 g/l AATCC detergent at 93° F., 80 rpm and 110 ppm water hardness using a 10 minute wash and 5 minute rinse. The L, a, and b values were measured before and after the wash.

The ΔE was calculated from the following equation: $\Delta E=[(L_1-L_2)^2+(a_1-a_2)^2+(b_1-b_2)^2]^{0.5}$ The test results are summarized in Table II.

TABLE II

Results of the prespotter test for anhydride based graft copolymers on Dust-Sebum stains.

| Polymer | ΔE for prespotter test without detergent |
| --- | --- |
| None | 4.5 |
| Ex. 2 | 13.0 |
| Ex. 3 | 14.9 |
| Ex. 4 | 15.7 |

The results in Table II show that the styrene-anhydride copolymers grafted with polyethylene glycol function as prespotters displaying excellent soil release properties even when washed in the absence of any other detergent.

The styrene-anhydride copolymers grafted with polyethylene glycol when used in a laundering process, remove soil from fabrics, inhibit soil deposition on fabrics, and provide soil resistance to fabrics. The styrene-anhydride copolymer grafted with polyethylene glycol are sufficiently hydrophilic to absorb to the fabrics.

While the invention has been described with particular reference to certain embodiments thereof, it will be understood that changes and modifications may be made by those of ordinary skill in the art within the scope and spirit of the following claims.

What is claimed is:

1. In a laundry detergent composition comprising a surfactant and builder, the improvement comprising adding from about 0.1 to about 25 weight percent, based on the total weight of the laundry detergent composition, of a styrene-anhydride copolymer grafted with polyethylene glycol which is prepared by reacting in a solvent styrene monomer selected from the group consisting of styrene, substituted styrene, and mixtures thereof, with an anhydride monomer selected from the group consisting of maleic anhydride, itaconic anhydride, and mixtures thereof, to form a styrene-anhydride copolymer which is reacted with polyethylene glycol having the formula $R^1-(CH_2CH_2O)_m-R^2-$ wherein $R^1$ is H or $NH_2$; $R^2$ is selected from the group consisting of an alkyl group having $C_1-C_4$, phenol, and OH; and m is from about 2 to about 100, to form a water-soluble or water dispersible styrene-anhydride copolymer grafted with polyethylene glycol.

2. In a laundry detergent composition comprising a surfactant and builder, the improvement comprising adding from about 0.1 to about 25 weight percent, based on the total weight of the laundry detergent composition, of a styrene-anhydride copolymer grafted with polyethylene glycol which is prepared by reacting in a solvent styrene monomer selected from the group consisting of styrene, substituted styrene, and mixtures thereof, with an anhydride monomer selected from the group consisting of maleic anhydride, itaconic anhydride, and mixtures thereof, to form a styrene-anhydride copolymer which is alkoxylated to form a water-soluble or water dispersible styrene-anhydride copolymer grafted with polyethylene glycol, wherein the alkoxylation is accomplished using ethylene oxide or a combination of ethylene oxide and an alkyl oxide having 3 to 20 carbon atoms.

3. The laundry detergent composition according to claim 2 wherein the alkyl oxide is selected from the group consisting of propylene oxide, butylene oxide, hexylene oxide, and combinations thereof.

4. The laundry detergent composition according to claim 1 wherein the styrene-anhydride copolymer grafted with polyethylene glycol comprises a mixture of half esters of styrene-maleic anhydride copolymers and polyethylene glycol.

5. The laundry detergent composition according to claim 4 wherein the styrene-anhydride copolymer grafted with polyethylene glycol further comprises at least one unreacted component selected from the group consisting of styrene-maleic anhydride, polyethylene glycol, and styrene-maleic acid.

6. The laundry detergent composition according to claim 1 wherein the substituted styrene monomer is selected from the group consisting of 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, and mixtures thereof.

7. The laundry detergent composition according to claim 1 wherein the anhydride monomer is maleic anhydride.

8. The laundry detergent composition according to claim 1 wherein the polyethylene glycol has a weight average molecular weight of about 100 to about 6000.

9. The laundry detergent composition according to claim 7 wherein the polyethylene glycol has a weight average molecular weight of about 200 to about 1000.

10. The laundry detergent composition according to claim 9 wherein the polyethylene glycol has a weight average molecular weight of about 500 to about 800.

11. The laundry detergent composition according to claim 10 wherein the polyethylene glycol is methoxy polyethylene glycol having a weight average molecular weight of about 550 to about 750.

12. The laundry detergent composition according to claim 1 wherein $R^2$ in the formula for the polyethylene glycol is methyl and m is from about 8 to about 20.

13. The laundry detergent composition according to claim 1 wherein the styrene-anhydride copolymer grafted with polyethylene glycol is present in an amount of from about 0.5 to about 10 weight percent.

14. The laundry detergent composition according to claim 1 wherein the styrene-anhydride copolymer grafted with polyethylene glycol is present in an amount of from about 1 to about 5 weight percent.

15. The laundry detergent composition according to claim 1 wherein the styrene-anhydride copolymer is reacted with polyethylene glycol in the presence of a hydrophobe.

16. The laundry detergent composition according to claim 15 wherein the hydrophobe is selected from the group consisting of a polysaccharide based surfactant, and a functionalized alcohol alkoxylate having the formula $R^3$—$(CH_2CHR^4O)_m$—$R^5$ wherein $R^3$ is OH or $NH_2$; $R^4$ is selected from the group consisting of hydrogen, methyl, ethyl, propyl, and phenyl; $R^5$ is selected from the group consisting of hydrogen, and a $C_1$–$C_{20}$ alkyl, alkaryl, or aryl group; and m is from 0 to about 20.

17. The laundry detergent composition according to claim 16 wherein the polysaccharide based surfactant is a alkylpolyglycoside, wherein the alkyl group has $C_6$–$C_{20}$ and the glycoside has one to ten repeat units.

18. The laundry detergent composition according to claim 16 wherein the polysaccharide based surfactant is polyalkylglucamide, wherein the alkyl group has $C_6$–$C_{20}$ and the glucamide group has one repeat unit.

19. The laundry detergent composition according to claim 16 wherein the hydrophobe is selected from the group consisting of a $C_6$–$C_{20}$ aliphatic alcohol or amine, an alcohol ethoxylate having a $C_6$–$C_{20}$ alcohol and 6 to 20 moles of ethoxylation, an alkylphenol ethoxylate having a $C_6$–$C_{20}$ alkyl group and 6 to 10 moles of ethoxylation, and combinations thereof.

20. The laundry detergent composition according to claim 19 wherein the hydrophobe is selected from the group consisting of a $C_8$–$C_{12}$ aliphatic alcohol or amine, an alcohol ethoxylate having a $C_{12}$–$C_{15}$ alcohol and 7 to 9 moles of ethoxylation, and an alkylphenol ethoxylate having a $C_8$–$C_9$ alkyl group and 6 to 8 moles of ethoxylation.

21. The laundry detergent composition according to claim 15 wherein the styrene-anhydride copolymer grafted with polyethylene glycol further comprises at least one unreacted component selected from the group consisting of styrene-maleic anhydride, polyethylene glycol, styrene-maleic acid, and a hydrophobe.

22. The laundry detergent composition according to claim 1 further comprising at least one additive selected from the group consisting of water, ion exchangers, alkalies, anticorrosion materials, antiredeposition materials, antistatic agents, optical brighteners, perfumes, fragrances, dyes, fillers, chelating agents, enzymes, fabric whiteners, brighteners, sudsing control agents, solvents, hydrotropes, bleaching agents, bleach precursors, buffering agents, soil removal agents, soil release agents, fabric softening agent, and opacifiers.

23. In a fabric softening composition, the improvement comprising adding 1 to 50 weight percent, based on the total weight of the fabric softening composition, of a styrene-anhydride copolymer grafted with polyethylene glycol which is prepared by reacting in a solvent styrene monomer selected from the group consisting of styrene, substituted styrene, and mixtures thereof, with an anhydride monomer selected from the group consisting of maleic anhydride, itaconic anhydride, and mixtures thereof, to form a styrene-anhydride copolymer which is reacted with polyethylene glycol having the formula $R^1$—$(CH_2CH_2O)_m$—$R^2$— wherein $R^1$ is OH or $NH_2$; $R^2$ is selected from the group consisting of an alkyl group having $C_1$–$C_4$, phenol, and H; and m is from about 2 to about 100, to form a water-soluble or water dispersible styrene-anhydride copolymer grafted with polyethylene glycol.

24. In an aqueous prespotter composition, the improvement comprising adding 1 to 99 weight percent, based on the total weight of the prespotter composition, of a styrene-anhydride copolymer grafted with polyethylene glycol which is prepared by reacting in a solvent styrene monomer selected from the group consisting of styrene, substituted styrene, and mixtures thereof, with an anhydride monomer selected from the group consisting of maleic anhydride, itaconic anhydride, and mixtures thereof, to form a styrene-anhydride copolymer which is reacted with polyethylene glycol having the formula $R^1-(CH_2CH_2O)_m-R^2-$ wherein $R^1$ is OH or $NH_2$; $R^2$ is selected from the group consisting of an alkyl group having $C_1-C_4$, phenol, and H; and m is from about 2 to about 100, to form a water-soluble or water dispersible styrene-anhydride copolymer grafted with polyethylene glycol.

* * * * *